Dec. 15, 1925.

E. H. PASQUÉ ET AL 1,565,387

SURFACE CONTACT FOR ELECTRIC RESISTANCE THERMOMETERS

Filed April 13, 1925

INVENTORS
Ernest Henry Pasqué
Arthur Blaine Walker

BY Parker & Burton
ATTORNEYS

Patented Dec. 15, 1925.

1,565,387

UNITED STATES PATENT OFFICE.

ERNEST HENRY PASQUÉ AND ARTHUR BLAINE WALKER, OF DETROIT, MICHIGAN

SURFACE CONTACT FOR ELECTRIC RESISTANCE THERMOMETERS.

Application filed April 13, 1925. Serial No. 22,699.

*To all whom it may concern:*

Be it known that we, ERNEST HENRY PASQUÉ and ARTHUR BLAINE WALKER, citizens of the United States, residing at Detroit, county of Wayne, State of Michigan, have invented a certain new and useful Improvement in Surface Contacts for Electric Resistance Thermometers, and declare the following to be a full, clear, and exact description of the same, such as will enable others skilled in the art to which it pertains to make and use the same, reference being had to the accompanying drawings, which form a part of this specification.

Our invention relates to an improved surface contact for a temperature measuring device, and pertains particularly to a thermometer adapted for registering local surface temperatures on the human body and which is intended particularly for the use of diagnosticians.

The object is to provide a heat measuring instrument of this character with an improved contact point adapted to accurately register local surface temperatures on the human body throughout a substantially continuous period of use during which the varying temperatures of a plurality of locations are successively registered. The temperatures which an instrument of this character are required to measure are relatively low and it is essential that minute variations in temperature be recorded by the instrument.

Two different types of instruments are in common use, one is the electric resistance thermometer, the other instrument is of the thermocouple type. In each case a contact tip is provided which is adapted to be placed upon that surface of the body, the temperature of which it is desired to determine and by means of a suitable circuit through a galvanometer the temperature reading is taken. We have illustrated our invention more in detail in connection with the electric resistance thermometer but it is equally adapted for use in connection with the thermocouple type of device and is also so shown.

If the contact tip of the thermocouple or the coil of the electric resistance thermometer which is employed to make the surface contact is entirely unprotected on the side opposite the side that contacts the body, it is influenced by the atmospheric temperature and the reading taken is inaccurate. On the other hand, if the coil is provided with a cover to overcome such fault, it has been found that while the initial reading is substantially accurate, continued subsequent readings taken at different locations are apt to be incorrect, for as the contact point is moved over the body from one place to another in obtaining temperature readings of different local surfaces, the air within the cover becomes superheated and influences the coil and the local body surface upon which the tip is placed is also brought under the influence of the superheated air within the cover and as a result of this combination of influences the reading taken by the instrument is not a true measure of the pyrometric state of the body surface upon which the contact is made but represents in part the effect of the superheated air within the cover.

Reference is hereby made to our incomplete application, Serial No. 738,944, filed September 20, 1924, and the amendment made therein under date of November 7, 1924.

Our improvement consists in providing a heat measuring instrument of the character described with a surface contact point having a contact coil or member adapted to be placed upon an external object to take temperature readings thereof, which contact coil or member is so supported as to prevent the formation of a superheated air pocket on one side thereof within the support and which permits circulation of air over the contact coil. This coil or contact member is carried by a suitable supporting cover provided with restricted atmospheric openings which prevent unlimited circulation of air over the coil but insure such a circulation as will forestall the superheating of the air within the support. If the air within the supporting cover is permitted to become superheated, not only is the coil affected directly thereby but a hyperemic condition is induced at that portion of the body engaged by the contact coil and the true temperature is not reflected in the reading.

The above objects and others together with the details of the construction illustrated in the accompanying drawing and defined in the appended claims will more fully appear from the following specification.

Figure 1:
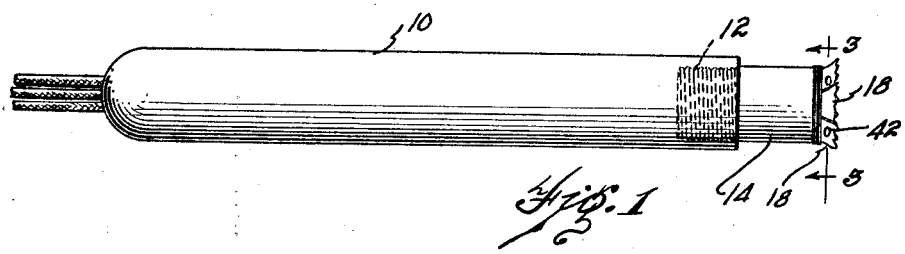
Fig. 1 is a side elevation of our invention illustrated in connection with an electric resistance thermometer surface contact point.
Figure 2:
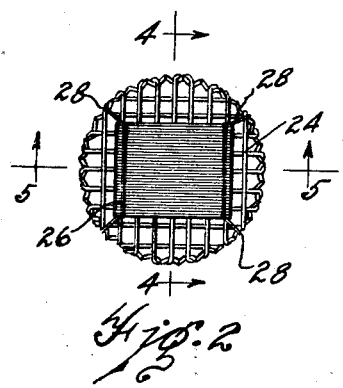
Fig. 2 is an end elevation of the tip of the contact point of Fig. 1.
Figure 3:
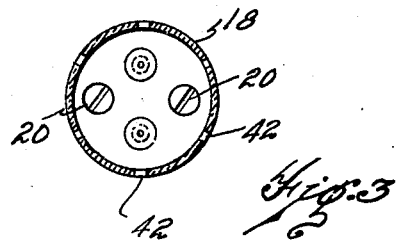
Fig. 3 is a cross sectional vertical section taken on line 3—3 of Fig. 1.

In the drawings, we have shown our invention more in detail in electric resistance thermometer construction, in which let 10 indicate a suitable handle of insulating material which is internally threaded as at 12 to removably receive a tip 14 which is threaded at 16 to engage with the threaded handle. There is secured to the free end of the tip a cup or saucer shaped support or cover member 18, which I have shown as fastened to the tip by means of screws 20. This cup shaped support 18 has a serrated edge 22 to which is secured a net 24 of insulating material.

Figure 4:
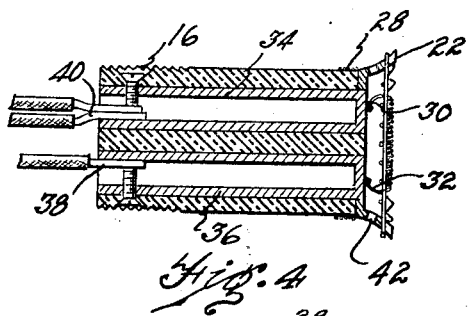
Fig. 4 is a vertical longitudinal section taken on line 4—4 of Fig. 2.
Figure 5:
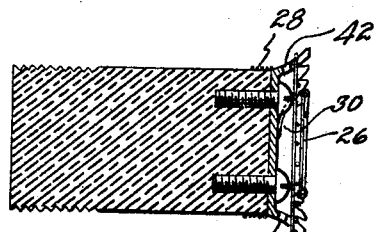
Fig. 5 is a vertical longitudinal section taken on line 5—5 of Fig. 2.

A fine electric resistance coil 26 is secured to the outer face of the net by loops 28, which are drawn back and wound about the body of the tip as appears in Figs. 4 and 5. The ends 30 and 32 of the coil are secured to contact members 34 and 36 respectively, which are disposed within the tip as appears in Fig. 4. These contact members may be hollow as shown in such figure of the drawing and fastened thereto are the line contacts 38 and 40 which extend rearwardly through the handle portion 10 to be connected with the electric circuit within which is disposed the recording instrument to register the unbalanced condition of the electric bridge produced by the heating of the coil.

Figure 6:
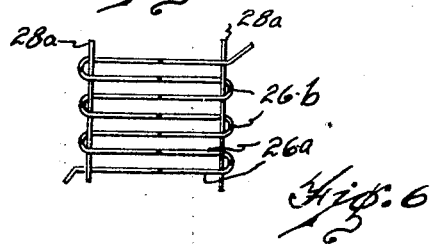
Fig. 6 is a diagrammatic elevation of a modified structure.

In the thermocouple type of instrument the bi-metallic contact member is shown in diagrammatic elevation in Figure 6. Supports 28$^A$ are stretched across the mouth of a cup shaped member similar to the member 18 and the joints between the two metals which form the bi-metallic contact 26$^A$ are indicated as 26$^B$.

Due to the low temperatures which are recorded by an instrument of this character and the very slight variations in temperature which it is necessary to indicate, it is essential that the instrument be very sensitive and accurate and it has been found that if the coil is entirely unprotected that the surface which is not brought into contact with the external object, the surface temperature of which is to be recorded, is influenced by the atmospheric temperature and the reading taken does not indicate the true pyrometric condition of the surface of the body. On the other hand, if the coil is covered on one side or provided with a covered support to protect it from the influence of the atmospheric temperature, it has been found that when the instrument is employed to take a number of successive temperature readings at different places that the air within the cover becomes superheated and this temperature persists from one reading to another and successive readings taken do not accurately indicate the surface temperature conditions which it is desired to record. The superheated air within the cover also affects the local body surface covered by the tip and induces a hyperemic condition which does not reflect the true body temperature.

We provide a saucer shaped support of insulating material. The coil or contact member is carried by the support, spaced from its base and in such a manner as to be brought into surface contact with an external object and the wall of the support is provided with a limited number of restricted air openings 42 through which the heated air within the cover above the coil may escape to prevent the temperature being built up within such chamber, yet the openings are so restricted as to prevent the uninterrupted circulation of air through the cover which would completely open the coil to the influence of the atmospheric temperature.

What we claim is:

1. In a heat measuring instrument, a handle, a cup shaped tip member at one end of the handle, a contact member mounted on the tip so as to extend across the mouth of said tip and adapted to be brought into surface contact on one side with a body, the heat of which is to be measured, said tip member being provided with restricted air openings through its wall.

2. A surface contact point for an electric resistance thermometer comprising a hollow handle provided with a removable tip member consisting of a cup shaped support of insulating material, an electric coil mounted within the cup shaped support and spaced from the bottom thereof to provide an air chamber between the coil and the base of its support which communicates with the outer air by means of a restricted air opening provided in the tip member.

3. A surface contact point for an electric resistance theremometer comprising a handle provided with a support for an electric resistance coil, a resistance coil carried by said support being adapted to be brought into surface contact with a body the heat of which is to be measured, said support being provided with a determined limited number of restricted air openings through its wall between the base of the support and the coil to permit restricted circulation of air between the coil and the base of the support.

4. A surface contact point for an electric resistance thermometer comprising a tip member, an electric resistance coil supported at one end thereof and spaced from the base to provide an air chamber therebetween which communicates with the outer air by restricted air openings provided in the tip member.

5. A surface contact point for an electric resistance thermometer comprising a hollow handle, a tip member removably secured to one end of the handle and consisting of a cup shaped support of insulating material having a serrated edge, a net of insulating material secured to said serrations extending across the open end of the cup shaped support, an electric resistance coil mounted upon said net, said coil having electric connections extending through the tip and through the hollow handle, said support having restricted air openings through its wall to permit escape of air from the interior of the cup to the atmosphere while preventing unlimited circulation of air through the cup.

In testimony whereof, we sign this specification.

ERNEST HENRY PASQUÉ.
ARTHUR BLAINE WALKER.